United States Patent
Van Sprang et al.

(10) Patent No.: US 11,618,119 B2
(45) Date of Patent: Apr. 4, 2023

(54) METHOD FOR EXAMINING THE CLAMPING STATE DURING ACCELERATION PHASE

(71) Applicant: FRANZ KESSLER GMBH, Bad Buchau (DE)

(72) Inventors: Joachim Van Sprang, Ravensburg (DE); Harald Weing, Biberach an der Riss (DE)

(73) Assignee: Franz Kessler GmbH, Bad Buchau (DE)

( * ) Notice: Subject to any disclaimer, the term of this patent is extended or adjusted under 35 U.S.C. 154(b) by 211 days.

(21) Appl. No.: 17/210,880

(22) Filed: Mar. 24, 2021

(65) Prior Publication Data

US 2021/0299808 A1    Sep. 30, 2021

(30) Foreign Application Priority Data

Mar. 30, 2020   (EP) .................................. 20 166 854

(51) Int. Cl.
*B23Q 17/00* (2006.01)
(52) U.S. Cl.
CPC ......... *B23Q 17/003* (2013.01); *B23Q 17/002* (2013.01); *B23Q 17/005* (2013.01)
(58) Field of Classification Search
CPC .. B23Q 17/003; B23Q 17/005; B23Q 17/002; G05B 2219/50183; G05B 2219/49177
See application file for complete search history.

(56) References Cited

U.S. PATENT DOCUMENTS 8,132,335 B2    3/2012  Dreier
2019/0381623 A1*  12/2019 Van Sprang ....... B23Q 17/2216

FOREIGN PATENT DOCUMENTS

DE    10 2006 016 919 A1   10/2007
EP       2 312 270 A1    4/2011
EP       3 581 328 A1   12/2019

OTHER PUBLICATIONS

Extended European Search Report (Application No. 20166854.8) dated Sep. 11, 2020.

* cited by examiner

*Primary Examiner* — Alan Snyder
(74) *Attorney, Agent, or Firm* — Burr Patent Law, PLLC

(57) ABSTRACT

There is proposed a method for examining the clamping state of a tool holder or tool which is clamped in a tool clamping device of a rotor unit of a motor-driven machine tool unit, with the spacing of the sensor head from a component of the rotor unit being measured, with a recording of at least one time and/or position-related sequence of the spacing values measured with the sensor head, wherein for improved integration of the method the recording of a first and a second time and/or position-related sequence is carried out during an acceleration of the rotation of the rotor unit with respect to the stator unit, in particular when the rotor unit is started up, wherein the time and/or position-related information of the sequence vectors of the first and/or second sequence is scaled using the respective associated current speed ($v_0$).

19 Claims, 4 Drawing Sheets

METHOD FOR EXAMINING THE CLAMPING STATE DURING ACCELERATION PHASE

This application claims the benefit under 35 USC § 119(a)-(d) of European Application No. 20 166 854.8 filed Mar. 30, 2020, the entirety of which is incorporated herein by reference.

FIELD OF THE INVENTION

The present invention relates to a method for examining the clamping state of a tool holder or a clamped tool which is clamped in a tool clamping device of a rotor unit.

BACKGROUND OF THE INVENTION

From the prior art, for example, from EP 3 581 328 A1, a method for examining a clamping state in a machine tool unit is known, wherein via a sensor head which is arranged at a fixed position the spacing with respect to the rotor unit is measured. In this instance, for example, prior to the processing of the workpiece during a specific period of time, a time sequence of measurement values is recorded and evaluated in order to be able to determine an axial run-out error therefrom. Furthermore, other devices for examining the precision of working spindles in machine tools is known, for instance, from EP 2 312 270 A1 having a length measurement system which has a glass rod which carries a marking and a reading device, or a device for identifying foreign bodies in the gap between the tool and the spindle, as set out in DE 10 2006 016 919 A1.

SUMMARY OF THE INVENTION

An object of the present invention is to be able to propose a method for examining the clamping state which can be integrated in the processing process in a simpler manner.

As a result of the measures mentioned in the dependent claims, advantageous embodiments and developments of the invention are possible. The method according to the present invention for examining the clamping state is characterized in that during the actual measurement there is in principle no longer any time loss and a measurement can be carried out in an unlimited manner, for example, even after each tool change or tool holder change. In this manner, it can also be integrated in a simpler manner in the processing process, particularly since it is not necessary to individually provide a time period during which only the examination method can or has to be carried out.

According to the present invention, there is firstly considered a motor-driven machine tool unit which comprises a stator unit and a rotor unit, wherein the rotor unit is rotatably supported about a rotation axis. The rotor unit which rotates with respect to the stator unit generally belongs to a motor spindle drive. The actual machining tool (milling tool, drill, etcetera) is in turn retained or clamped in a tool holder which is arranged in turn in a tool clamping device which is intended to be considered to be part of the spindle head of the rotor unit. The tool clamping device has for this purpose a retention device for a tool holder. The tool clamping device is acted on with a clamping force and displaced in the longitudinal direction of the rotation axis. A portion of the clamping device may in this instance be drawn, for example, into a tapering receiving member so that the tool holder or the tool can in turn be clamped inter alia with a radially acting force. By releasing the clamping force, the clamped tool is released again and can be removed from the machine tool or changed.

Furthermore, an examination device for examining the clamping state of the tool or tool holder is provided and has one or more sensor heads for sensor detection. Generally, the use of an individual sensor head is sufficient. The actual sensor is accommodated in the sensor head; the sensor measures its spacing with respect to the rotor unit, wherein the sensor itself is arranged accordingly in the stator unit. The sensor data are processed or evaluated using an electronic unit or an electronic evaluation system which may be computer-controlled.

The at least one sensor head is in principle arranged on the stator unit at a fixed position in the region of the tool clamping device and can measure both at the end face on the rotating spindle head and laterally. Deformations which originate during clamping of the tool or the tool holder as a result of jammed chips, an obliquely located tool, tool holder or the like occur primarily in the region of the tool interface or on the tool holder.

In principle, however, sensor heads may also be arranged so as to be able to be varied in terms of position. Generally, for example, a chip which is jammed in the tool clamping device and which has fallen between the tool and the tool clamping device or the clamping jaws, leads to the tool no longer being located straight in the tool clamping device or the tool clamping device becoming readily (also resiliently) deformed, and an unchanged concentricity, an unchanged axial run-out of the tool/tool holder or running without a change of angle no longer being able to be ensured. A disruption of the concentricity generally represents a particular impairment of the processing. Such deformations generally occur both laterally and at the end face and can in principle also be detected at that location. At the end face, a spacing parallel with the rotation axis is measured, laterally a spacing which extends radially with respect to the rotation axis is measured. All such deformations up to displacements of the rotor unit can be determined in this manner.

A measurement can in principle be carried out at a 90° angle with respect to the surface and/or the rotation axis of the rotor unit, but also at an angle different therefrom.

Particularly with machine tools, high demands are placed on the processing precision. The tool must during the processing operation be inserted in a precisely defined manner in the tool holder or in the tool clamping device and moved so that the workpiece which is intended to be processed is processed within the intended tolerance limits. Even when the machine tool and in particular the tool clamping device are produced with the required precision, when the machine is used additional factors are involved and may prevent a defined concentricity/axial run-out from continuing to be produced or no angular errors from occurring. During operation of the machine, the chips which occur during the processing operation may remain stuck in the tool clamping device, to the tool holder or the tool and ensure that when a tool is changed the new tool cannot be clamped in the actual desired position. The same applies with a tool holder change. During clamping, pressure forces instead occur at local locations at which, for example, a chip is located between the tool and tool holder or between the tool holder and tool clamping device. It is also conceivable for the tool holder to be retracted into the tool clamping device in such a manner that the retraction position thereof, that is to say, its position in the direction of the rotation axis with respect to earlier installation situations, has changed.

Since the chips are sometimes very small, these errors are often difficult to determine and also occur randomly when the tool holder or other regions of the machine tool have been cleaned in conventional manner after a processing process. Nonetheless, such concentricity errors or incorrect angular positions of the tool may lead to the workpiece being outside tolerance limits after the processing operation.

The sensor head measures a time or position-related sequence of spacing values. If the sensor head records a time sequence of spacing values, it is generally at the same time a position-related sequence since the rotor unit is rotated in a time sequence, unless between the recording of individual measurement values always precisely one complete rotation or a plurality of whole-numbered rotations have been carried out.

Generally, according to the present invention not only changes to the axial run-out can be determined, but, for example, also changes in the angular position and in the concentricity.

The method according to the present invention is characterized in that at least one marking on the rotor unit or at another location on the rotor shaft is predetermined. This, even in the case of an unknown speed or angular speed, enables a reference marking to be able to be used and enables clear detection of when the rotor unit has performed precisely one revolution. This is particularly advantageous when, regardless of other sensors, an axial run-out or angular error is intended to be determined without a separate rotary encoder also being involved in the evaluation. This marking can preferably also be detected at the same time by the sensor head or the sensor heads during the actual measuring operation. No further sensor is thus required for this in principle. However, it is also conceivable for an additional sensor to be provided to separately identify the marking, in particular, when the spacing measurement is intended to remain independent of the marking identification.

In a variant of the present invention, there is also the option for more than one marking to be arranged, in particular, on the measuring ring. In this manner, even more information can be obtained by the measurement and, for example, enables a detection of the rotation direction, signal orientation or a synchronization. In order to obtain additional information when the marking is detected, the marking may, for example, also have a different shape, for example, an oblique-angled trapezium, so that, for example, the rotation direction can be identified from this.

Since by means of the marking the current speed of the rotor unit can also be detected, as a result of this, the precision of the error measurement according to the method according to the present invention is also influenced by this in a substantial manner. Whilst it was previously necessary to carry out this measurement at a constant speed in order to compare and correlate the measurement values with each other accordingly, the present invention is based on saving this otherwise required period of time and, for example, being able to carry out a meaningful measurement during the acceleration phase of the rotor unit, in particular, when the rotor unit of the machine tool is started up.

When the machines are started up, there is an acceleration of the rotor unit with respect to the stator unit. During this period of time, the method according to the present invention is now used. In this instance, a first or second sequence of spacing values is generally recorded outside the marking region. Since these measurements are carried out during an acceleration phase of the rotation of the rotor unit, however, these spacing values cannot initially be readily correlated since the temporal scanning is generally carried out at a predetermined timing rate, that is to say, in equal time portions, but the accelerated rotor unit rotates to differing degrees between two sequential times and therefore the positions, in particular, with at least two sequences of measurements, no longer correspond.

The path/time relationship or angle/time relationship is described as follows:

$$s(t)=0.5at^2+v_0t,$$

where s(t) is the time-dependent path travelled in the time period t or the angular range travelled in the time period t, a is the acceleration, $v_0$ is the current speed at the time considered at the beginning of the time period t.

According to the present invention, sequences of measurement values are recorded. In this instance, the spacing of the sensor head which is secured to the stator unit with respect to the rotor unit is determined and it is measured whether this spacing changes during rotation of the rotor unit. In order to be able to compare the sequences with each other or to evaluate the data (for example, to be able to subtract the sequences), the spacing values must be able to be associated with the respective positions. However, the time is generally measured during the recording of the spacing values.

The rotor unit is initially accelerated when the machine is started up. This acceleration can be carried out in a substantially uniform manner, that is to say, a is substantially constant. Precisely when the rotor unit is started up, however, there are also in principle no constant acceleration phases.

At the beginning of the start-up process, however, the acceleration is generally not constant during a specific time period. The speed as a function of time is in this range curved slightly to the left, a so-called S-curve, that is to say, the rotor unit starts up slightly more slowly so that the start-up runs smoothly. A so-called jerk limiting is also referred to. It is, therefore, advantageous not to measure from the stopped state, but instead in a range approaching constant acceleration.

For each sequence, a quantity of sequence vectors can accordingly be formed and contain:
the measured spacing value,
the time information at the time of the measurement of the spacing value, and
a speed value, the so-called current speed; if the rotor unit is accelerated and if the speed measurement is carried out over a specific period of time, generally the same associated current speed values will also correspond in at least two sequential vectors.

A scaling is carried out according to the present invention mathematically under the condition that with two measurements which follow at times shortly one after the other the quadratic component of the equation of motion, thus expresses the angular portion which can be attributed to the acceleration, can be disregarded.

Such a linearization is possible only when the time period between the measurement of two spacing values is selected to be small enough. Accordingly, the current speed is associated with the first and the second sequence even if one of the measurements is carried out later and the actual speed value differs from the associated current value. Since the term in which the time flows quadratically and which describes the acceleration decreases, a linear scaling using the speed under the provided mathematical conditions is consequently possible. The measurement can consequently, for example, also be carried out during the start-up phase of the machine. The period of time which the machine requires to start up, whether it be a short or a long period of time, always has to be waited since in this period of time the precise provisions for the processing operation (for instance, the speed of the tool) are generally not yet reached. However, it is particularly advantageous if, already when the rotor unit is started up, it can be determined whether, for example, an axial run-out error or concentricity error or an angular error is present since the procedure can then also be interrupted where applicable and a cleaning or repositioning of the tool can be carried out before a processing operation. In the event of a tool change, for example, it should generally be taken into account that a change of the axial run-out, the concentricity or the angular position is carried out. If this deviation is so large that it exceeds a (where applicable previously defined) threshold, an error is present.

As a result of the method according to the present invention, the production time can also be increased which is also directly linked to cost advantages. In a particularly advantageous manner, the rotor unit is accelerated in a uniform manner during the entire recording of measurement values. This also further simplifies the evaluation, wherein the approximation simply involves omitting the acceleration portion from the path or angle/time graph. This is possible since the sequentially measured measurement values are recorded very shortly one after the other and consequently the time spacing or angular spacing thereof is only small, that is to say, the acceleration term which is quadratically dependent on time with uniform acceleration is accordingly negligibly small.

In an embodiment of the present invention, the scaling is thus carried out taking into account the acceleration by current speeds at different times and the time period between the speed measurements being determined. As a result of the omission of the acceleration term, the path/time graph or angle/time graph contains a linear term which is linearly dependent on the time and into which the speed (path speed or angular speed), not the acceleration, is introduced as a constant. Depending on the embodiment of the present invention, the current speed may be determined in different manners. It may, for example, be advantageous to determine the current speed with reference to the marking by the time between successive detections of the marking being measured by the sensor head. Such a measurement is all the more precise when the marking constitutes only a comparatively narrow portion in an angular segment, ideally constitutes a localized marking. Furthermore, it is conceivable for the marking to be constructed in such a manner that it takes up a predetermined circular arc portion and the time is determined in which the marking which extends over a previously known angular portion passes the sensor head.

If, for example, a single marking is provided, that is to say, per revolution the sensor head is passed precisely once by the marking, a current speed measurement is carried out by a current speed being determined with to some degree an imprecision of a speed change within a revolution. Differences as a result of the acceleration within this period of time of a revolution are then not taken into account. Conversely, the measurement is accordingly more precise when the marking constitutes only a fraction of the entire rotation angle of 360° and, for example, it is determined when the front portion of the marking in the rotation direction reaches the region of the sensor head and the rear portion of the marking in the rotation direction subsequently passes the sensor head.

For example, the marking of a construction variant of the present invention may be constructed as a groove, for instance in a measurement ring which is individually fitted for this purpose to the rotor unit, so that the regions outside the groove and inside the groove have different spacing values. There are then measured, for example, the flanks which occur at the edges of the groove and which accordingly change the spacing values measured by the sensor head. The groove may in principle have flanks which extend perpendicularly or radially in the direction toward the rotation axis or which are chamfered.

Accordingly, the path can be followed by the sensor head during the measurement of the spacing values. Depending on the current angular speed or path speed, the occurrence of the flanks in shorter or longer periods of time can be observed. In particular with a high rotation figure, an approximation which enables a linearization can be carried out in such a manner that, for example, the measurement values of the first or second time and/or position-related sequence of measurement values are carried out within a revolution of the rotor unit. In this case, it is assumed that the speed remains constant within the revolution. Precisely at high rotation figured, as occur in machine tools, this approximation is certainly prone to relatively small errors. In particular at the end of the start-up phase, higher angular speeds may be anticipated so that the measurement with the estimation which has been carried out in this range is more precise than at the beginning of the start-up phase.

With the detection of the flanks at the edges of a marking which covers a specific angular portion, this marking is subdivided to some degree into partial markings so that, for example, it can be determined using the sensor head when the marking reaches the region of the sensor head and leaves the region of the sensor head again. For example, it can thus be measured when the marking reaches the region of the sensor head and the first flank is detected by the sensor head. In this instance, the period of time between two measurement events in which the marking occurs and has in each case the same spacing value. In a similar manner, time points can be used when the marking moves out of the region of the sensor head again. In this manner, an error estimation can be carried out since for each measurement point, that is to say, for both points at which the same spacing value is present, a current speed can be determined, but at the same time the period of time which is between the two points can also be measured.

As already set out above, the respective speeds can be determined, that is to say, with reference to a marking which is expanded over a specific angular range or with reference to the appearance of the same marking after a revolution. In this manner, it is estimated how the speed changes over time so that an error which occurs during the approximation is estimated from this if it is assumed at temporally sequential points that the acceleration term can be disregarded.

In this manner, it can advantageously also be determined how precisely the method is operating and where applicable it can accordingly be adapted. In an advantageous embodiment of the invention, time or position-related sequences of spacing values can be used as a reference measurement. For example, it is conceivable to accordingly measure a new machine tool, a new tool holder, a new tool in which a chip cannot yet have been recorded by a processing operation and to record a first sequence of measurement values as a reference. It is also conceivable after a cleaning operation to allow the rotor unit to run with a cleaned tool holder in order to produce a corresponding reference measurement. Any deviation from the reference measurement can consequently be determined, and it is then evaluated whether the deviation is so large that a concentricity error, a changed axial run-out or an angular error is present. In this manner, the precision of the processing can be considerably improved. The measurement of the operating situation constitutes the comparison measurement, which is correlated with the reference measurement.

With a sequence of spacing values, the marking may, in particular, be set as an initial point in order in particular during the difference formation and/or the Fourier transformation to be able to associate the spacing values different sequences with each other. In this regard, a reference measurement is advantageous since, as a result of the measurement itself, it can be determined when a complete revolution has been carried out. This is particularly advantageous when the method is carried out without values relating to the current speed or velocity being supplied to the electronic evaluation system by other sensors or by the machine controls, but instead only the values of the sensor head or the sensor heads carry out this determination.

In principle, for a revolution the spacing profile can be completely recorded per se. However, there are very high rotation numbers and generally it is also advantageously possible to measure with a comparatively high scanning rate. If, for example, as a result of a chip or as a result of a tool/tool holder which has been installed/clamped in a tilted manner, an axial run-out error or an angular error is present, wherein, for example, the tool is located obliquely relative to the rotation axis, a periodically occurring deviation will be able to be determined. In order to be able to evaluate this, it is therefore advantageous to carry out a Fourier transformation of the signal, which, in particular, is carried out to simplify the evaluation as a discrete Fourier transformation, preferably as an FFT or a DFT. To this end, the values of the first and second sequence can be subtracted from each other, wherein to this end the positions of the spacing measurements have to correspond. Such a difference formation can, however, also be carried out after the Fourier transformation of the respective sequences. Ideally, all the spacing values would be identical so that in comparison with the reference measurement there is no changed axial run-out, no impairment of the concentricity or no changed angular position. As a result of static and systematic errors, simply during the measurement, however, it cannot be anticipated that the sensor head even without a changed axial run-out, without a changed angular position or without a concentricity error always measures precisely the same spacing values.

If the spacing values have irregularities, in particular singularities, they can accordingly be determined since they are periodically detected and it is consequently also possible to associate with them a frequency which can be determined as a result of the Fourier transformation. It is also conceivable for a mean value of the time or position-related sequence to be carried out with subsequent difference formation between mean values.

Depending on which type of error (axial run-out error with local deformation or angular error with uniform changing of the spacing) is present, this can also lead to identification patterns which, as long as they are known, provide information as to which type of error is involved, whether, for example, a chip is jammed, where this chip can be found or whether the tool or the tool holder is tilted, etcetera. To this end, methods of artificial intelligence, in particular machine learning, can be used in order to be able to identify and evaluate the types of the corresponding errors, whether it be an axial run-out or an angular error. The use of neuronal networks is also possible in this regard. This measure advantageously not only enables the occurrence of an error to be identified, but also enables it to be determined in greater detail what the error actually involves so that ultimately a solution is enabled, for example, by means of selective cleaning of the machine. The idle times of the machine can thereby be significantly reduced. With a clamped chip, it may particularly be anticipated that components of the tool holder or also of the tool clamping device are deformed at different locations. In the evaluation sequence, it is consequently possible to search for changes in the measurement signal, that is to say, changed time or position-related spacing values.

However, it should be taken into account that each measurement is also in principle subjected to errors. The more precise the measurements are and the higher the scanning rates used for the measurement are, the greater the likelihood that even in the event of an adequate axial run-out the same spacing values will not always be measured over a revolution. Therefore, it is advantageous to be able to estimate tolerances. In particular, a threshold value can be determined, from which it is actually assumed that a chip has become jammed or another error contributes to a deviation from the axial run-out or the concentricity or leads to an angular error, which actually also has to be corrected. In this regard, such changes in the measurements can advantageously be compared with respect to a predetermined threshold value.

In an embodiment of the present invention, in the evaluation sequence, in particular, in the Fourier transforms at a frequency value which corresponds to the number of revolutions per time unit of the rotor unit, difference values of the spacings are compared with a threshold value. If the threshold value is exceeded, an axial run-out error/concentricity error/angular error is assumed since, for example, a chip which is clamped in the clamping device or between the tool holder and tool has led to a local deformation.

Furthermore, in a construction variant of the present invention, a displacement of the rotor unit or the rotation axis can be determined from the difference of two of the time or position-related sequences. This displacement may, for example, have the effect that the tool has been placed on the workpiece earlier or later than thought or provided for by the machine controls. The processing precision can thereby be influenced accordingly, even when the tool or the tool holder is not tilted. Such changes may occur when the tool/the tool holder, for example, is also incorporated without any angular error. With such deviations, either the tool protrudes further out of the tool holder or the tool holder protrudes further out of the clamping device, or it is positioned further inside.

Furthermore, the corresponding method may in principle also be used in the stopped state when corresponding displacements, for example, before and after the tool change or tool holder change are compared with each other.

BRIEF DESCRIPTION OF THE DRAWINGS

Embodiments of the present invention are illustrated in the drawings and are explained in greater detail below with reference to other details and advantages.

DETAILED DESCRIPTION OF THE INVENTION

Figure 1:
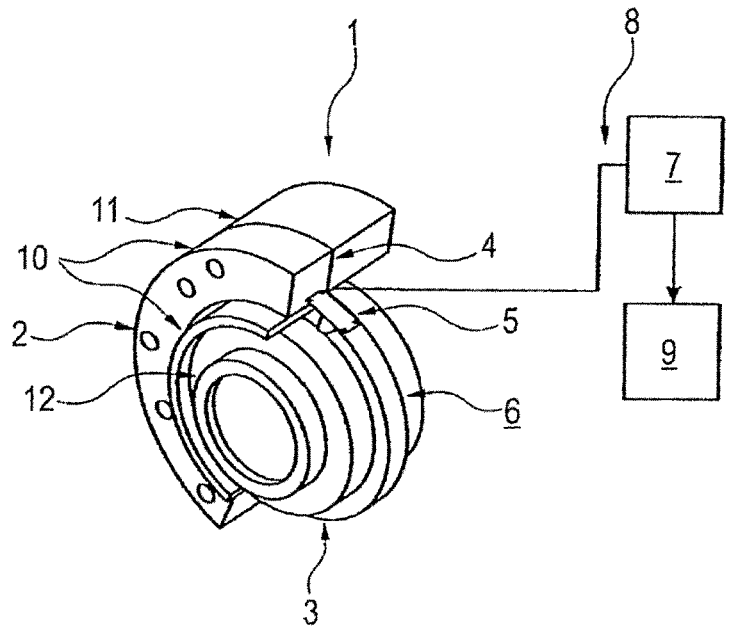
FIG. 1 is a schematic illustration of a machine tool unit according to the present invention.

FIG. 1 is a schematic illustration of a machine tool unit 1 having a stator unit 2 and a rotor unit 3, wherein in FIG. 1 particularly the spindle head can be seen as a portion of the rotor unit 3. The stator unit 2 has a ring 4 to which a sensor head is fitted in the form of an axial sensor 5. The rotor unit 3 comprises a measuring ring 6 which comprises a metal and which in this instance is advantageously produced from a paramagnetic material. The axial sensor 5 is arranged in such a manner that it measures the spacing from an end-face surface of the rotor unit 3. However, lateral measurement radially with respect to the rotation axis is also conceivable. This surface from which the spacing is determined is located on the measurement ring 6. The axial sensor 5 is constructed as an eddy current sensor in order in spite of any contamination to be able to obtain the most precise measurements possible.

The sensor head/axial sensor 5 is connected to an electronic unit 7; both together form the examination device 8 which in turn is connected to the machine control 9 so that where applicable an intervention can be carried out in the control in the event of excessively powerful axial run-out errors.

In a particularly preferred development, only one sensor head 5 is provided. It is conceivable to additionally use a trigger sensor, for example, in order to identify an optical reference marking on the measurement ring 6, wherein such a trigger sensor can, for example, also be fitted to the sensor ring 4. The marking may also be constructed as a groove or the like. With such a trigger sensor, only the initial point for the measurements is triggered so that, during the evaluation, the phase relationships of the measurement values with respect to each other can be determined in a simpler manner. A trigger sensor is not absolutely necessary and is also not illustrated in greater detail in FIG. 1.

The stator unit 2 comprises a cover 10 for the sensor ring 4 and furthermore a bearing cover 11. A tool clamping device 12 is fitted to the rotor unit 3 (the conical ring is illustrated in FIG. 1).

Figure 2:
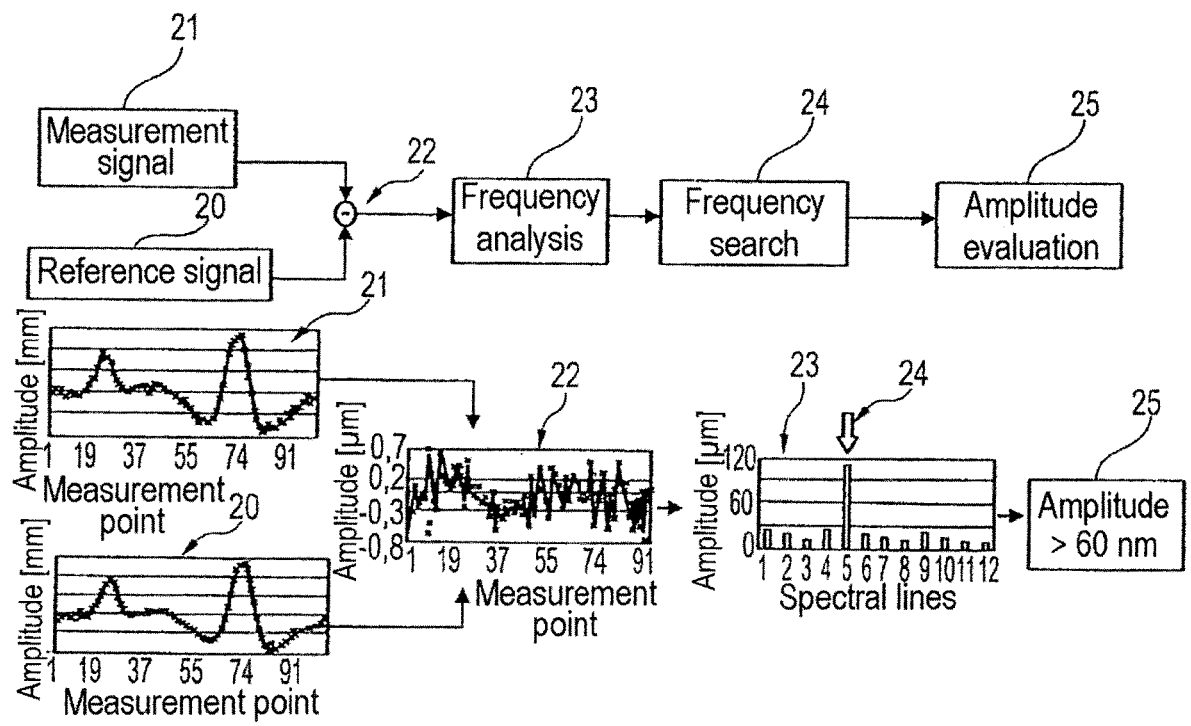
FIG. 2 is a schematic illustration of an extract of the examination method according to the present invention for examining the clamping state.

With the tools which are available and which are clamped in the tool holder, a series 20 of reference measurement values is in each case initially recorded with the new machine tool unit 1. This can be carried out in the factory or on the client's premises. A reference measurement can also be carried out with a tool or tool holders; however, this is not absolutely necessary, but increases under some circumstances the precision of the measurement and where applicable also facilitates the identification of small chips in the region of the tool interface, particularly when individual tools or tool holders are intended to be used. During operation, with the same tool/tool holder a new sequence 21 of spacing values is then subsequently determined. A set of reference measurements for different tools or tool holders can be carried out; this measure increases the precision of identification. Since the sequences 20, 21 are recorded when the machine unit 1 is started up and consequently during the acceleration of the rotor unit 3, the position indications of the respective spacing values have to be scaled in order to be able to be compared with each other. In FIG. 2, the values are accordingly already scaled for the sequences 20, 21. In FIG. 2, the difference 21 is formed. Subsequently, a frequency analysis 23 of the signal is carried out in the form of a Fourier transformation. It is checked (method step 24) whether a deviation is present at a specific frequency, for example, for the rotation frequency of the rotor unit 3 or at which frequencies such changes appear. If these exceed a threshold value, there is a disturbance variable, for example, a deformation as a result of a jammed chip in the region of the interface (amplitude evaluation: method step 25).

Figure 3:
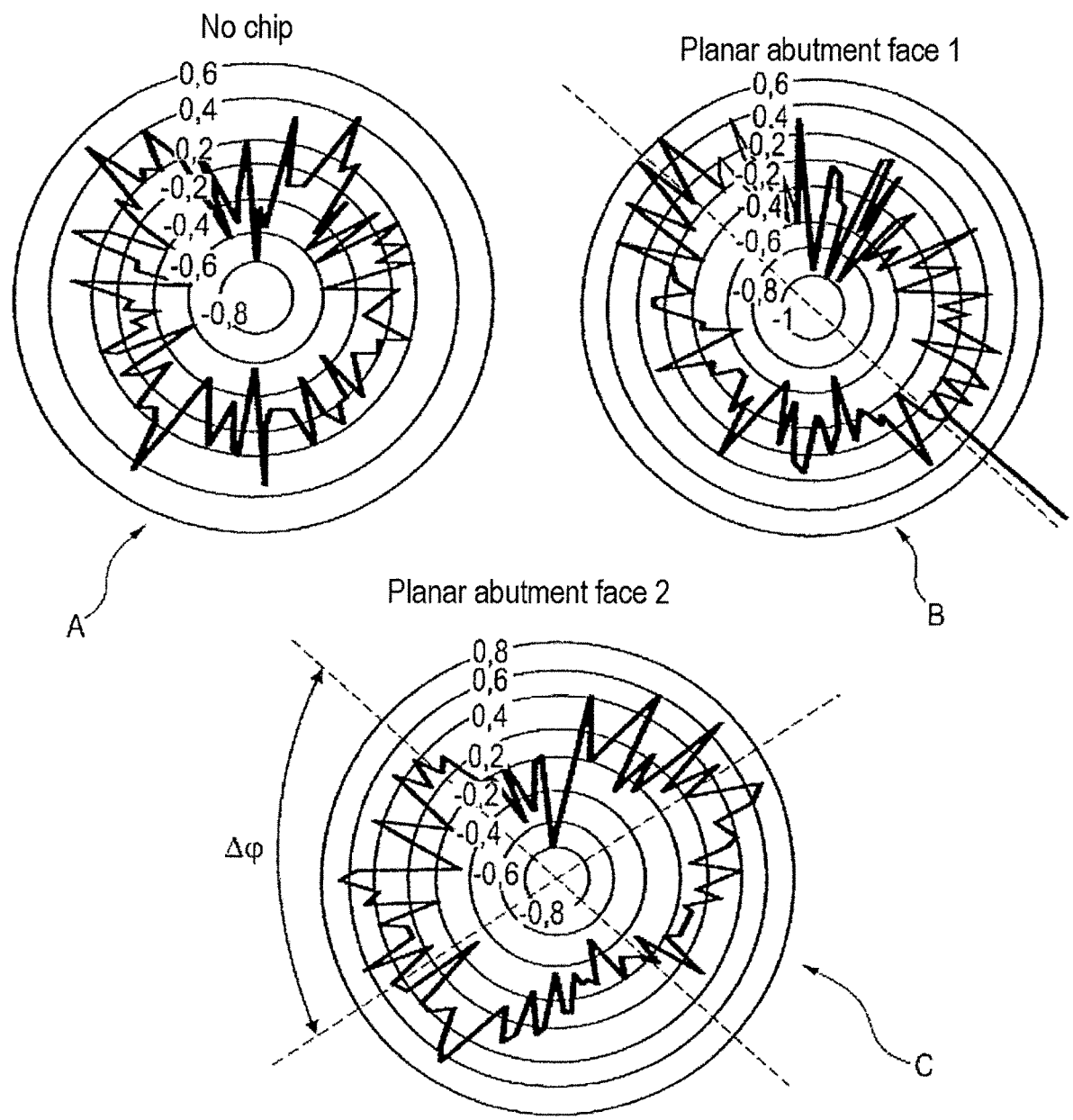
FIG. 3 is an illustration of a deformation pattern as an evaluation result.

In FIG. 3, typical deformation images are shown, wherein in the illustration A there is no chip and the amplitude distribution is significantly more uniform in the entire angular range, whilst in the illustration B a chip is jammed in the tool receiving member and brings about a significant changed distortion (between 10-11 o'clock and 4-5 o'clock) with higher (changed) amplitudes. Accordingly, the threshold value can also be determined. In the illustration C, the chip is located at another angular position so that the illustration C differs by $\Delta\varphi$ from the illustration B primarily with regard to the phase.

Figure 4:
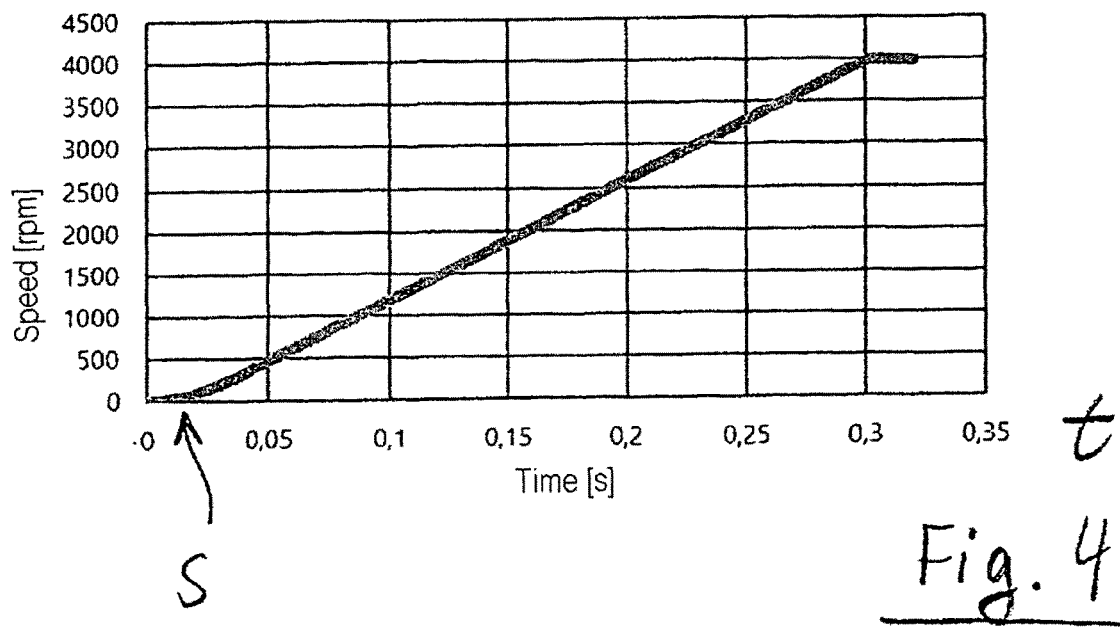
FIG. 4 is a graph relating to the dependency of the speed with respect to time for illustrating the start-up of the rotor unit.

During series operation, the clamping state examination can be carried out in very short time sections of the start-up phase. In FIG. 4, for example, in the first 300 ms, there is produced an acceleration of the rotor unit, during which a measurement value detection is already carried out. The speed of the rotor unit is illustrated in accordance with the time path t. The S-curve S shows a curve which is curved slightly to the left, that is to say, a slow start-up in order to prevent jerky movements. A linearization is not advantageous in this region since the acceleration is not constant and an approximation by disregarding the acceleration portion is generally too imprecise. However, a constant acceleration is substantially otherwise present, that is to say, a linear dependence of the speed on the time t. If no axial run-out can be established, the processing can be carried out. Otherwise, braking must be carried out for safety reasons according to the invention. From approximately 300 ms, a constant speed of approximately 4000 rpm is achieved for the exemplary processing operation.

Figure 5:
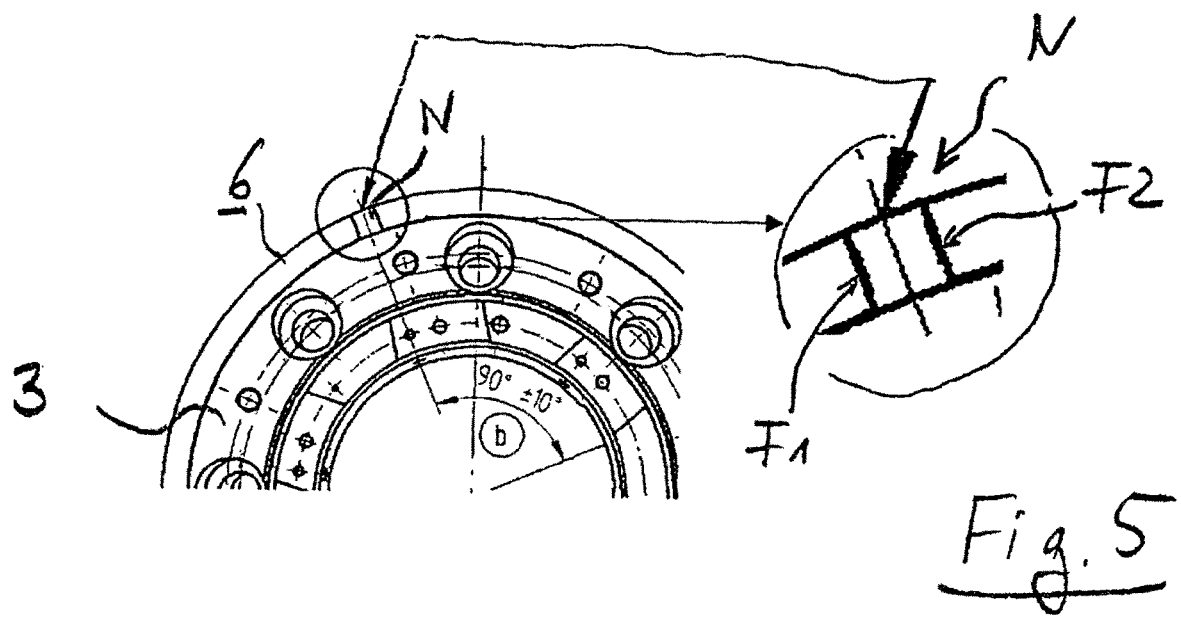
FIG. 5 shows a radially orientated groove which is fitted to the measurement ring.

In FIG. 5, a section through a rotor unit 3 with a measuring ring having a groove in the side region is illustrated. The enlarged illustration illustrates the edge regions F1, F2 which can be constructed as flanks and which can be detected with a correspondingly high scanning rate. Consequently, for example, a current speed can also be determined from when the sensor head detects the corresponding flanks at the beginning and at the end of the groove N. Since the angular region over which the groove N extends is known, the angular spacing between these two flanks is also known so that only the period of time between the appearance of the flanks has to be determined.

Figure 6:
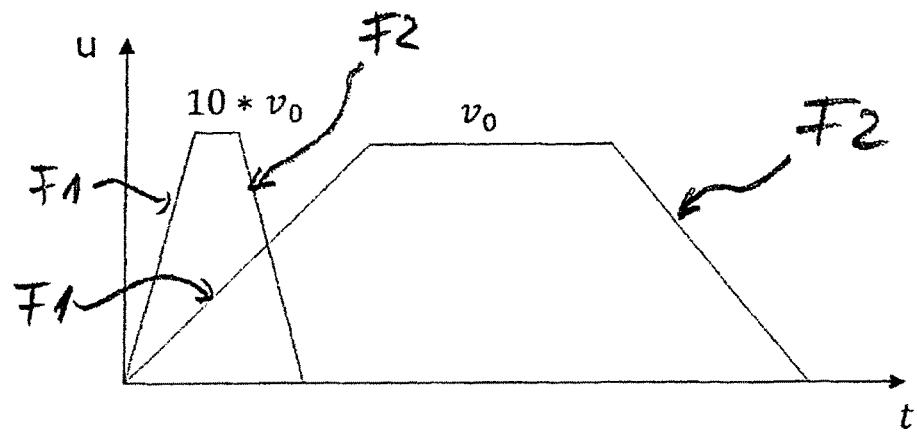
FIG. 6 shows a space/time graph during detection of a groove.

FIG. 6 depicts two illustrations, in which the path of the measured spacing u between the sensor head and rotor unit is shown when the groove N passes the sensor head in each case at different speeds, in this instance once at 10-times the speed. In the region of the flanks F1, F2, the dependence of the spacing u on the time is ramp-like since the groove N in the region of F1, F2 also has a ramp-like path. The path is thus temporally compressed at relatively high speed 10 $v_o$.

Figure 7:
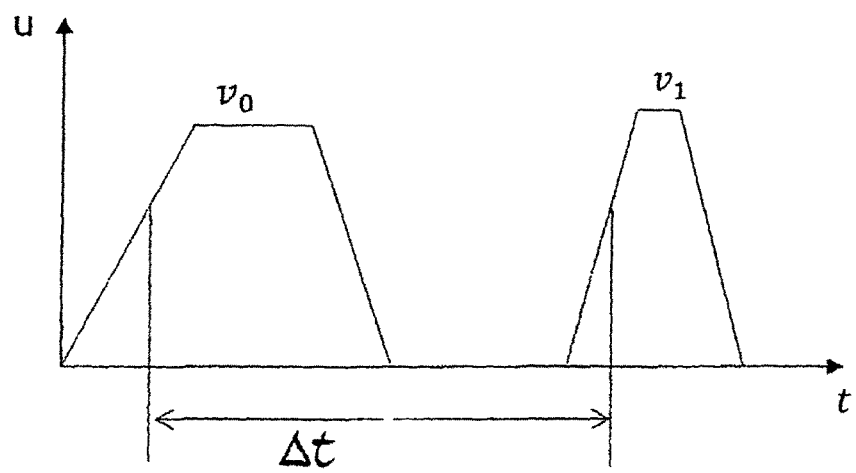
FIG. 7 is an illustration of an error estimation with reference to the space/time graph.

FIG. 7 illustrates again how an error in the linearization (omission of the acceleration term) can be estimated with short time spacings.

The same groove N is directly measured temporally one after the other with regard to the spacing u thereof. Since a uniform acceleration takes place, the subsequent measurement of the groove, which takes place, for instance, at the speed v1, is compressed with respect to the previous one, that is to say, v1>v0. Between both measurement events, there is a revolution. In the linearization, it is assumed that the same speed would be present between the two measurement events. The time period between both measurement events is the time which is between two points of the same flank F1 (or F2, respectively), at which the spacing is identical. The maximum error can consequently be estimated:

$$\Delta v/\Delta t = (v_1 - v_0)/\Delta t.$$

LIST OF REFERENCE NUMERALS

1 Machine tool unit
2 Stator unit
3 Rotor unit
4 Sensor ring
5 Axial sensor
6 Measurement ring
7 Electronic unit
8 Examination device
9 Machine control
10 Cover
11 Bearing cover
12 Conical ring/tool clamping device
20 Reference signal
21 Measurement signal
22 Differential operator
23 Frequency analysis
24 Frequency search
25 Amplitude evaluation
A Deformation pattern (without chip)
B, C Deformation patterns (with chip, at a different position)
F1, F2 Flanks at groove edges
N Groove
u Spacing
t Time
$v_0$ Speed
$\Delta\varphi$ Phase difference
a Acceleration

The invention claimed is:

1. A method for examining the clamping state of a tool holder and/or a tool which is clamped in a tool clamping device of a rotor unit of a motor-driven machine tool unit, wherein the tool holder and/or the tool is/are releasably fixed and clamped by a tool clamping device which can be acted on with a clamping force, wherein the tool clamping device is displaced in the longitudinal direction of the rotation axis when the tool is clamped, wherein the tool clamping device is arranged in the spindle head of the rotor unit, wherein the machine tool unit has a stator unit, with respect to which the rotor unit is rotatably supported about a rotation axis, wherein the method comprises the following method steps:
providing at least one sensor head for determining a spacing,
arranging the sensor head at a position on the stator unit,
measuring the spacing of the sensor head from a portion of the rotor unit,
recording at least one time and/or position-related sequence of the spacing values measured with the sensor head,
determining an axial run-out and/or a concentricity deviation and/or an angular change exclusively taking into account the time and/or position-related sequence of the measured spacing values with respect to the portion of the spindle head which is rotating relative to the sensor head,
wherein a marking is provided on the rotor unit,
wherein the sensor head detects the marking (N) on the rotor unit during measuring,
wherein with reference to the marking using the sensor head the current speed (v0, v1) of the rotor unit is detected,
wherein the recording of a first and a second time and/or position-related sequence of the spacing values measured with the sensor head is carried out during an acceleration of the rotation of the rotor unit with respect to the stator unit,
wherein the respective current speed is associated with the spacing values of the first and second sequence in order to form a sequence vector from the spacing value, the time and/or position-related information and the current speed (v0),
wherein the time and/or position-related information of the sequence vectors of the first and/or second sequence is scaled using the respective associated current speed (v0) so that the sequence vectors of the respective sequences each have at least one spacing value at corresponding positions on the rotor unit,
braking the rotor unit when an axial-run out deviation is identified.

2. The method according to claim 1, wherein the recording of a first and a second time and/or position-related sequence of the spacing values measured with the sensor head is carried out during an acceleration of the rotation of the rotor unit outside the marking.

3. The method according to claim 1, wherein the rotor unit is accelerated in a uniform manner during the entire recording.

4. The method according to claim 1, wherein the scaling is carried out taking into account the acceleration by the current speeds ($v_0$) being determined at different times and the time between the speed measurements being determined.

5. The method according to claim 1, wherein the current speed ($v_0$) of the rotor unit is determined with reference to the marking by:
a marking which marks a specific angular portion of the rotor unit during the rotation being provided as the marking and the time which the sensor head requires so that the marking at a known angular portion passes the sensor head being determined, and/or
the time between two sequential detections of the marking being measured by the sensor head.

6. The method according to claim 1, wherein a groove is used as the marking so that the region outside the groove and inside the groove have different spacing values.

7. The method according to claim 1, wherein the recording of the first and/or second time and/or position-related sequence is carried out during a revolution of the rotor unit.

8. The method according to claim 1, wherein a time and/or position-related sequence of spacing values which is used as a reference measurement is recorded with an ideally clamped tool and/or tool holder.

9. The method according to claim 8, wherein the reference measurement is recorded prior to the first processing operation by the machine tool unit and/or after a cleaning operation, individually for each tool used and/or for each tool holder used.

10. The method according to claim 1, wherein a time and/or position-related sequence of spacing values is recorded with a clamped tool and/or tool holder when the rotor unit is started up in order to reach an operating situation.

11. The method according to claim 10, wherein the time and/or position-related sequence of spacing values is recorded in a subsequent operating situation, compared with the reference measurement, which is used as a comparison measurement with respect to the reference measurement.

12. The method according to claim 1, wherein the marking is used as an initial point and the initial point for the evaluation is associated with the sequences of spacing values in order during the difference formation and/or the Fourier transformation to be able to associate the spacing values of different sequences with each other.

13. The method according to claim 1, using at least one of the following calculations, an evaluation sequence of values is determined:
- a difference formation between two of the time sequences and subsequently a Fourier transformation of the previously formed difference of the first and second time and/or position-related sequence, and/or
- a Fourier transformation of each of the sequences and subsequently a difference formation between the respective time sequences which have undergone Fourier transforms and/or
- forming the mean value of the time and/or position-related sequences with subsequent difference formation between the mean values.

14. The method according to claim 13, wherein, in the Fourier transform at a frequency value which corresponds to the number of revolutions per time unit of the rotor unit, the difference value of the spacings is compared with a threshold value and, in the event of the threshold value being exceeded, an axial run-out change and/or a concentricity change and/or an angular change is/are assumed.

15. The method according to claim 13, wherein the Fourier transformation is an FFT and/or DFT discrete Fourier transformation.

16. The method according to claim 1, wherein the evaluation sequence is examined for a deviation or at least two deviations which exceed a predetermined threshold value and, in the event of the threshold value being exceeded, an axial run-out change and/or a concentricity change and/or an angular change is/are assumed.

17. The method according to claim 1, wherein from the difference of two of the time and/or position-related sequences, a displacement of the rotor unit and/or the rotation axis is determined.

18. The method according to claim 1, wherein the determination as to whether an axial run-out error, and/or a concentricity error, and/or an angular error is/are present, is carried out using artificial intelligence, whereby a conclusion is drawn relating to the error and/or the change as a result of machine learning of the sequences.

19. The method according to claim 1, wherein the recording of a first and a second time and/or position-related sequence of the spacing values measured with a sensor head is carried out when the rotor unit is started up.

* * * * *